UNITED STATES PATENT OFFICE.

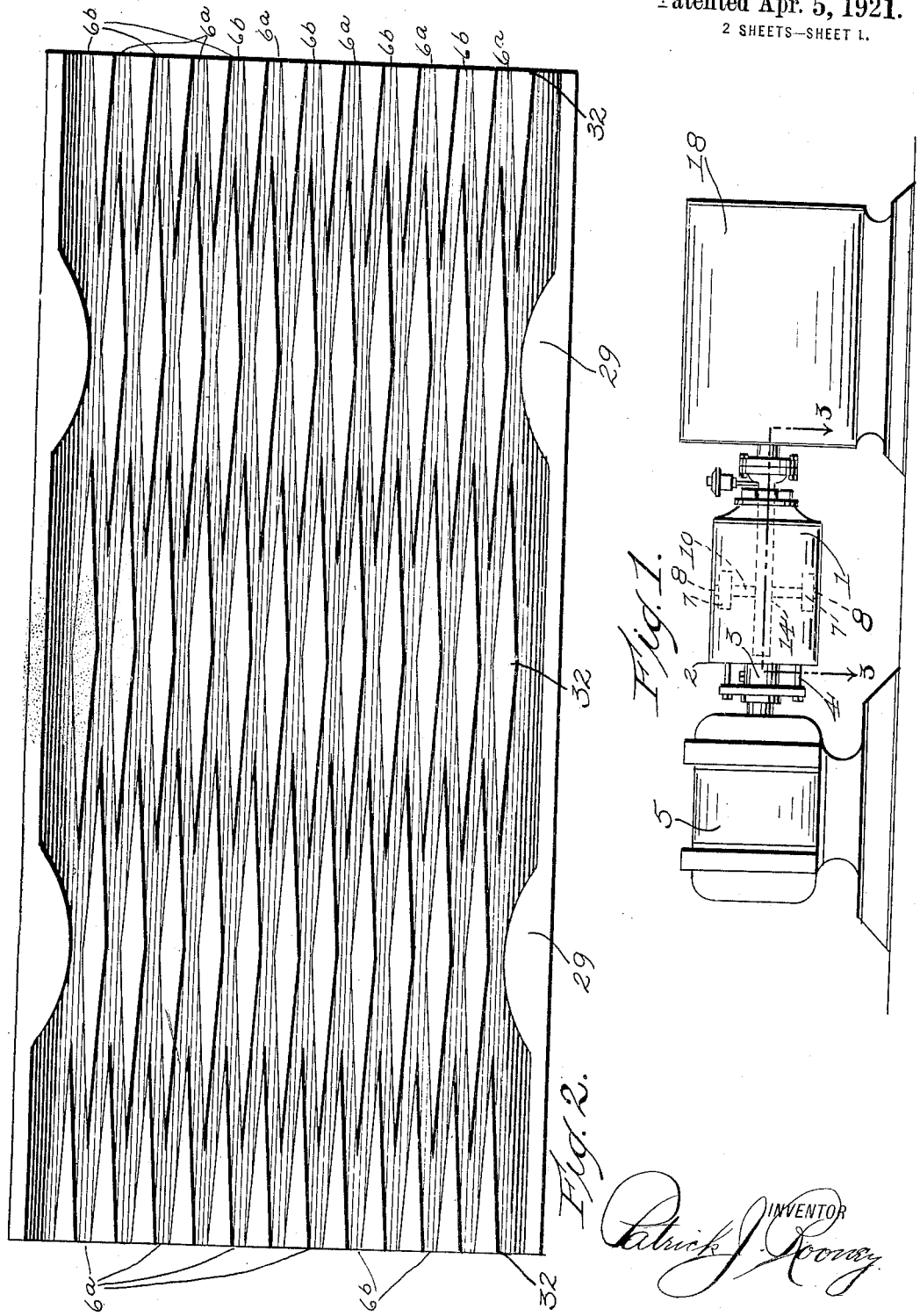

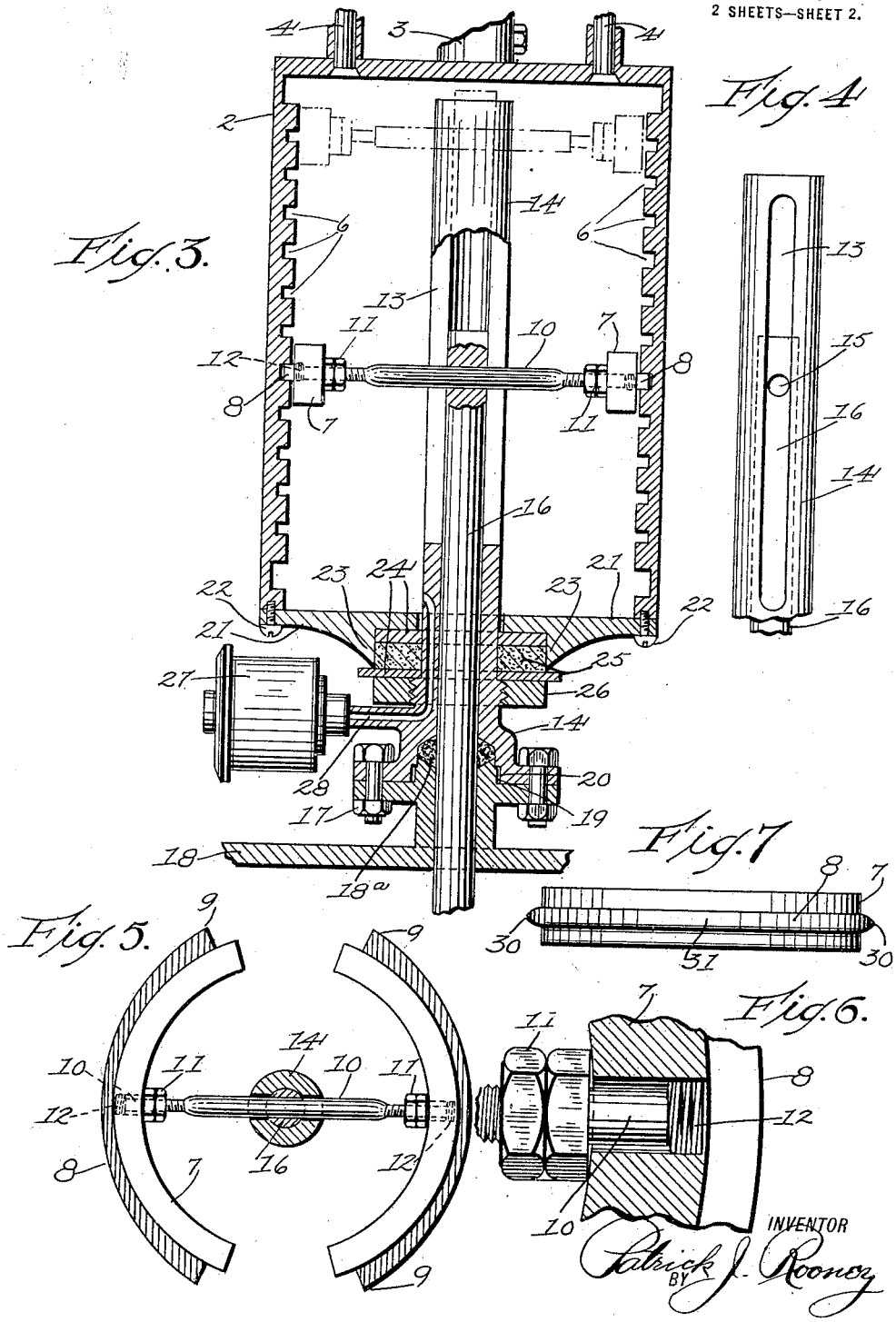

PATRICK J. ROONEY, OF NEW ROCHELLE, NEW YORK.

POWER-TRANSMISSION APPLIANCE FOR PUMPS AND COMPRESSORS.

1,373,764.   Specification of Letters Patent.   Patented Apr. 5, 1921.

Application filed February 16, 1920. Serial No. 358,995.

*To all whom it may concern:*

Be it known that I, PATRICK J. ROONEY, a citizen of the United States, residing at No. 106 Clove road, city of New Rochelle, county of Westchester, and State of New York, have invented a new and useful Power-Transmission Appliance for Pumps and Compressors.

My invention relates to pumps and compressors and has for its objects, first, to provide an appliance whereby the high speed rotary motion of electric or gas motors can be converted into slow speed reciprocating motion in a pump or compressor; second, to eliminate the necessity of using a train of gears to reduce the speed of rotation and then to use a crankshaft to convert rotary into reciprocating motion and to substitute therefor a simple, cheap and compact appliance which does the work of both; third, to provide an improved system of helical grooves embodied in a cylinder or drum and of a plurality of ribbed cylindrical segments adapted by engagement therewith to reciprocate a therewith connected shaft of a pump or compressor at slow speed in both directions when the drum is rotated at high speed by a gas or electric motor; fourth, to provide such a system capable of being operated without excessive friction or other mechanical disadvantages; fifth, to provide a means of amply lubricating such a system by splash and centrifugal force; sixth, to provide a convenient form of such apparatus for attachment to motors, pumps and compressors and seventh, to accomplish all of the foregoing objects at a small manufacturing cost.

I attain these and other objects by the mechanisms illustrated in the accompanying drawings, which show a preferred embodiment of my invention and in which Figure 1 is a side elevation showing conventionally an electric motor connected to a pump by my invention. Fig. 2 shows a development on a plane of my system of helical grooves and switches such that if this plane were wrapped about the inside of a hollow cylinder or drum so that its ends met perfectly it would then show the proper location and relative dimensions of my system of helical grooves and switches, it being understood that the shaded surfaces represent the grooves and the unshaded surfaces represent the original surface of the drum in which they are cut. Fig. 3 is an enlarged sectional view taken on a line marked 3—3 in Fig. 1, and shows a section of the drum as it would appear if the grooves shown on the plan Fig. 2 had been cut in the drum. Fig. 4 is an elevation of the reciprocating driven shaft and supporting sleeve with slot for cross bar guide therein. Fig. 5 is a top plan view of the cross bar with the cylindrical segments bearing elliptical-arc shaped ribs, hereinafter called followers, adapted to seat in the helical grooves. Fig. 6 is an enlarged sectional view of one follower showing the construction thereof. Fig. 7 is a front view of one follower.

Similar numerals refer to similar parts throughout the several views.

A hollow cylinder or drum 1 with one cover 2, preferably cast integral therewith, embodies a coupling 3 and is provided with bolts 4 for fastening to a motor 5. The inner circumference of the drum comprises a system of helical grooves 6, $6^a$ and $6^b$ for driving by sliding engagement therewith two cylindrical segments 7 the outer circumference of which corresponds to the inner circumference of the drum and each of which comprises a therefrom projecting rib 8 adapted to slide in and through the said helical grooves, which ribs have a thickness corresponding to the breadth of the grooves and the outer surface of the ribs 9 is of the shape of an arc of an ellipse and exactly corresponds to the curvature of the helical grooves; the length of these ribs along the surface 9 from point to point must be not less than the length of one side of the diamond shaped elevations left by the cutting of the grooves in the drum and preferably should be much longer in order that the bearing point in the center of the segment will not come opposite an open space in the cross grooves until the anterior portion of the ribs is firmly held by the grooves just beyond the said open space. The surface of the segment 7 must be sufficiently wide on both sides of the rib to bear against the surface of the drum above the grooves at all times in the operation thereof. The anterior and posterior ends of the ribs are rounded or sharpened as illustrated to serve as a guide in passing points of intersection of the grooves as well as in changing direction. These segments have bored recesses located at the center thereof in which are inserted the ends of the cross-bar 10 in loose engagement permitting the rotation of the segments about the cross-bar ends through an arc corresponding to the change of direction of slope of the segments at the beginning and end of each stroke. A part of the cross-bar ends is threaded as illustrated and provided with nuts and lock nuts 11 as illustrated in order that when assembling the apparatus the nuts may be turned back on the cross-bar until the segments are inserted in the drum and seated in the grooves whereupon the nuts and locknuts are turned out and adjusted so as to hold the segments or followers in engagement with the grooves but with sufficient play to permit of easy operation. Compression springs 12 are set in the recesses in the segments so as to bear against the ends of the cross-bar and press the followers outward and into close engagement with the grooves. The cross-bar passes through longitudinal slits 13 in a combined shaft sleeve and cross-bar guide 14 and then through a hole 15 in the pump or compressor shaft 16. The hole is located near the top of the shaft and is made large enough to allow sufficient play for the cross-bar to make up for any inequalities in the grooves or bearings. The cross-bar guide as illustrated is pipe-shaped with an enlarged section and a flange connection at its lower end and is provided with longitudinal slits of a width slightly exceeding the diameter of the cross-bar and also slightly exceeding in length the amplitude of reciprocation of the shaft and this cross-bar guide is fastened by bolts 17 to the upper plate or surface of the pump or compressor 18 or as illustrated to a projecting part of said upper plate, which part, with the said sleeve 14 forms a stuffing box 18$^a$. Tongues or keys 19 seated in grooves 20 in the cross-bar guide prevent it from being rotated and hold it firmly even when the bolts are adjusted loosely as when the stuffing box is newly filled. Other forms of cross-bar guides may be used and may be cast integral with the pump cover or may be attached to other parts thereof or to separate supports, the only necessary feature being that it shall permit reciprocating motion and prevent rotary motion of the cross-bar. A bottom plate 21 for the drum may be provided, as illustrated, to retain lubricating oil therein, and comprises a circular opening to go over the cross-bar sleeve and is fastened to the bottom of the drum, after the assembling of the driving apparatus therein, by cap screws 22. This bottom plate has a cylindrical cage 23 fitting over and against rings 24 between which is a felt washer 25 all held in position by an adjusting nut 26. Other types of bearings may be used however including ball or roller bearings, or the cross-bar guide may be extended through the top of the drum and provided with a thrust bearing on the outside thereof working in combination with a thrust companion bearing at 23. As illustrated however the drum is bolted fast to the motor shaft and a small fly-wheel mounted thereon and is held in rigid engagement with the motor shaft which must be provided with proper thrust bearings as it takes the thrust in both directions. However, when the drum is supported by the cross-bar guide or other supporting means and provided with thrust bearings on both sides, then flexible drive connections, universal joint connections or clutch connections may be used to rotate the drum or belt drive around the outside of the drum may be used, and various other modifications may be made in the bearings, couplings, supports and cross-bar guides of my invention. An oil cup for lubrication of the entire mechanism is shown at 27 with grooves 28 leading to a point inside of the drum and when the drum is kept about ($\frac{1}{4}$) one-quarter filled with oil it will oil every part by splash and centrifugal force, but other lubricating means may be used including grease or graphite mixed with oil as desired.

The helical grooves as shown are arranged for the driving of two followers which are pivoted on the ends of the cross-bar and work in a series of two helical grooves marked respectively 6$^a$ and 6$^b$, running in one direction and two running in the opposite direction. Each groove starts at the same distance from the top of the drum and at a circumferential distance of 180 degrees from each other, and each runs from the said starting point helically around the inside of the drum at the same slope and parallel with each other until each groove has made six complete turns and has reached the wide grooves at the bottom of the grooved space of the drum at which points another set of two helical grooves start from points still at an even distance from the top or bottom of the drum and still 180 degrees apart and wind, helically, about the inside of the drum for six complete turns until they have reached the point or place of beginning. Thus it will take six revolutions of the drum to reciprocate the pump or compressor shaft in one direction and six more revolutions to complete the reciprocation, thus making the ratio of speed between the motor and the driven reciprocating apparatus twelve to one. The distance of reciprocation as illustrated in the drawings is four inches, but the distance of reciprocation as well as speed ratio may be altered by changing the slope and number of windings of the helical grooves.

At the top and bottom boundaries of the grooved surface of the drum are switches 29 in the shape of promontories extending into the thereat widened grooves at the point where the change of direction of the grooves begins and when in the rotation of the drum the followers reach the limit of reciprocation the sharpened points 30 of such followers come into contact with the said switches which direct the ribs of the followers into the grooves of new direction. The promontory slopes of the switches should begin at the point reached by the anterior point 30 of the follower when in the rotation of the drum the center of the bearing point 31 of the follower has come opposite the point 32 in the grooves. The grooves opposite the points of change of direction and lying between the switches must be widened and deepened to allow the swinging about of the ribs of the followers when they change direction. During this change of direction of the followers the cylindrical segment forming part thereof 7 will, when the followers reach that point in the change of direction that they lie exactly at right angles to the axial line of the drum, bear along its entire length against the surface of the drum and at that moment the surface of the ribs 9 will lie deeper in the grooves, which must here be deepened accordingly, than at other times when the followers have swung into their usual slope across the said plane perpendicular to the axis at which usual slope the curve of the helical grooves as well as the curve of the ribs adapted thereto departs from the circular and becomes elliptic. And when the said followers swing into their usual slope as aforesaid the cylindrical part of the followers 7 will be in contact with the drum only across the central line thereof and the ends of these parts of the followers will retract from the drum while the ribs are fully seated therein from end to end. In the construction of the grooves, switches and followers these features must be accurately provided for in order to insure perfect functioning.

The operation is as follows: When the drum is rotated with the followers engaged in the helical grooves and attached to the cross-bar the latter is prevented from rotating by the action of the cross-bar guide and consequently each follower will be pressed or slid in one direction of reciprocation, and as each of the followers start at points in the same transverse plane and follow in grooves which are parallel to each other they will at all times be level with each other and with the cross-bar and by the continued rotation of the drum will be forced downward until the shaft is reciprocated fully in one direction at which moment both followers will come to the point where their anterior projections come into contact with their respective switches and they will at the same moment and still 180 degrees from each other be switched into the series of grooves running in the opposite direction by the operation of which they and the therewith connected cross-bar and shaft will be reciprocated in the opposite direction until they have completed the movement of reciprocation in that direction at which moment they will contact with the switches on that side and be again directed into the first series of grooves at the point or place of beginning. Meanwhile the rapid rotation of the drum will cause the oil contained therein to splash over the entire mechanism and this action is greatly helped by centrifugal force which keeps the grooves bathed in oil at all times and also prevents leakage through the bearings which are located in the center of the drum.

Various modifications may be made in my invention and I do not confine myself to the particular embodiment illustrated.

I claim:

1. In a power transmission appliance for pumps and compressors, in combination, a hollow cylinder with a plurality of helical grooves in the inner surface thereof, a plurality of ribbed cylindrical segments adapted to seat in the said grooves, a shaft to be reciprocated, means for connecting the said shaft to the said ribbed segments, means for preventing the rotation of the said segments and the said shaft to be reciprocated, means for changing the direction of slope of the said ribs at the point of departure of the said segments from one set of helical grooves and of entry into another set of helical grooves of opposite slope, a rotary motor, a coupling between the said motor and the said cylinder, connective means between the said reciprocating shaft and the instrument to be operated, bearings and lubricating means, substantially as described.

2. In a power transmission appliance for pumps and compressors, in combination, a hollow cylinder with a plurality of helical grooves in the inner surface thereof, sloping in opposite directions, a plurality of ribbed segments adapted to seat in the said grooves, a reciprocating pump shaft, means for connecting the said shaft with the said ribbed segments, means for preventing the rotation of the said segments and the said shaft, means for changing the direction of slope of the said ribbed segments at the point of departure of the said segments from one set of helical grooves and of entry into another set of helical grooves of opposite slope, a rotary motor, connective means between the said motor and the said cylinder, bearings and lubricating means, substantially as described.

3. In a power transmission appliance for pumps and compressors, the combination of a pump shaft, a cross-bar extending therefrom, a guide for preventing the rotation while permitting the reciprocation of the said shaft and cross-bar, a cylinder comprising a plurality of helical grooves therein sloping in opposite directions and therewith connected switches, a plurality of followers seated in the said grooves, and connected with the said cross-bar, supports and bearings and means for rotating the said cylinder, whereby when the said cylinder is rotated the pump shaft will be prevented from rotating and will as a result thereof be reciprocated fully in both directions.

4. In a power transmission appliance for pumps and compressors, in combination, a hollow cylinder embodying on the inside thereof a plurality of helical grooves, two of which slope in the same direction and two of which slope in an opposite direction and each set of two of which begin where the other ends and ends where the other begins and the beginning and ending points being 180 degrees around the inner circumference of the cylinder from the beginning and ending points of the opposite helical grooves, two cylindrical segments embodying therefrom projecting ribs adapted to seat in the helical grooves and corresponding in curvature therewith and with the anterior faces thereof rounded, wide grooves where the ribbed segments change slope and switches consisting of promontory shaped extensions into the said wide grooves adapted to come into contact with the anterior edge of the rib and thereby to change the direction of slope of the segment and to direct the same into a groove of opposite slope to that which it is leaving, a cross-bar, a shaft to be reciprocated, a connection therewith for the said cross bar, a cross-bar guide with slits therethrough permitting the reciprocation and preventing the rotation of the said shaft and segments, a plate covering the bottom of the said cylinder embodying a cage for a felt washer and bearing ring, an oil cup, a coupling, a rotary motor, a suitable instrument embodying the shaft to be reciprocated, bearings and supports, substantially as described.

5. In a power transmission appliance for pumps and compressors, in combination, a plurality of segments of cylindrical section, embodying therefrom projecting ribs of a curved form corresponding to the curvature of helical grooves comprised in a revoluble cylinder, and also embodying recesses adapted to receive the ends of a cross-bar extending from a shaft to be reciprocated into the said segments at about the center thereof, compression springs in the said recesses bearing against the ends of the said cross-bar and adapted to keep the said ribs seated in the said grooves, sharpened anterior projections of the said ribs, a revoluble drum comprising helical grooves adapted to receive the said ribs, and sloping in opposite directions, means for changing the direction of slope of the said ribs and for engaging the same with helices of opposite slope, bearings, couplings, a rotary motor, an instrument of the kind described embodying the shaft to be reciprocated, means for preventing the rotation of the said shaft and segments and lubricating means, substantially as described.

6. In a power transmission appliance for pumps and compressors, in combination, a revoluble cylinder, helical grooves therein, an extension of the width of the said grooves at a point opposite the beginning and end thereof and on both sides of said point extending to a promontory shaped switch leading from the said grooves into another set of helical grooves of opposite slope, a deepening of the said grooves where widened, a plurality of segments embodying therefrom projecting ribs, with sharpened anterior edges, corresponding in depth, breadth, and curvature with the said helices and adapted to seat therein, means for connecting the said segments with a shaft to be reciprocated, means for preventing the rotation of the said segments and the said shaft, a rotary motor, bearings, couplings, a suitable instrument of the class described embodying the shaft to be reciprocated, and lubricating means substantially as described.

7. In a power transmission appliance for pumps and compressors, in combination a revoluble cylinder hollowed out in the form of a drum comprising helical grooves on the inner circumference thereof adapted by sliding contact with ribbed segments affixed to a cross-bar passing through a slotted cross-bar guide and through a shaft, to reciprocate the said shaft in both directions when the drum is rotated, a cover over one end of the said drum comprising a coupling for connection to a rotary motor, and a covering plate for the other end of the said drum with one side thereof flattened and adapted to fit closely against the outer edge of the said drum about its entire circumference and with the other side thereof increasing in thickness from the circumference toward the center thereof and embodying a cage to contain a felt washer and a bearing ring, a cross bar guide fitting as a sleeve over the said shaft and with a threaded portion near the last mentioned drum cover, an adjusting nut and ring for bearing against the said felt washer and the drum cover, an oil cup with an oil groove leading therefrom to a point inside the drum, a suitable instrument of the class mentioned comprising a shaft to be reciprocated by the driving mechanism and cross-bar aforesaid, a rotary motor, bearing supports, and a proper lubricant for feeding through the said oil cup and grooves, substantially as described.

8. In a mechanism of the character described, a pump shaft, a shaft guide, a revoluble cylinder comprising helical grooves and switches in the surface thereof, a follower comprising a cylindrical segment of a width greater than the helical grooves over which it slides and with a therefrom projecting rib formed integral therewith and shaped to correspond to the width, depth, curvature and angle of the said helical grooves and adapted to be seated in the same, a cross-bar connected with the shaft to be reciprocated and adapted to be connected with the said follower in unfixed pivotal engagement therewith so that the entire follower will change direction at the end of each stroke while the rib remains fixedly supported over its whole length by the entire mass of metal in the said follower.

9. In a mechanism of the character described, the combination of a reciprocating pump, a shaft extending therefrom, a shaft guide, a revoluble cylinder comprising therein a plurality of helical cam surfaces sloping in opposite directions, switches, a plurality of ribbed followers adapted to coact with the said helical cam surfaces, connective means between the followers and the pump shaft, a rotary motor and connective means between the said rotary motor and the said cylinder.

10. In a mechanism of the character described, a combined support and guide firmly attached to a pump cover and projecting therefrom in the form of a sleeve, a pump shaft extending into the said sleeve, a cross-bar projecting through slits in the said sleeve from the said pump shaft, a cylinder comprising helical grooves therein, ribbed followers seated in the said grooves and mounted pivotally upon the said cross-bar, bearing surfaces upon the said support for the said cylinder, longitudinal slits in the said sleeve support corresponding in length to the amplitude of reciprocation of the pump shaft and corresponding in width to the diameter of the cross-bar, so that when the cylinder is rotated the cross-bar with the thereupon mounted followers is prevented from being rotated and caused to be reciprocated along with the therewith connected pump shaft.

PATRICK J. ROONEY.

Witnesses:
 ISAAC A. LEVY,
 WALTER LAIER.